3,358,041
PREPARATION OF VINYL ETHERS AND CATALYST THEREFOR
Henry O. Mottern, Far Hills, and Morton W. Leeds, Murray Hill, N.J., assignors, by mesne assignments, to Air Reduction Company, Incorporated, New York, N.Y., a corporation of New York
No Drawing. Filed Oct. 22, 1965, Ser. No. 502,287
3 Claims. (Cl. 260—614)

This invention relates to a novel process for preparing vinyl ethers and to novel catalysts used therein.

Vinyl ethers are useful compounds which have found application as intermediates and as monomers in the production of homopolymers and copolymers for adhesive coating and film-forming compositions and for fabricating structural and decorative elements. Vinyl ethers can be prepared by the reaction of acetylene with an alcohol, e.g. a lower alkyl alcohol such as methanol. The vinylation of alcohols with acetylene to produce the corresponding vinyl ethers requires the use of a catalyst, and it has been proposed to use a strongly alkaline alkali metal compound.

Catalysts heretofore used in vinylation processes have tended to be relatively expensive, or they have tended to become deactivated rather rapidly during the course of the reaction, or they have presented handling problems in many cases. Moreover, some prior art catalysts are highly hygroscopic, cannot readily be produced in finely-divided form with maximum surface area, tend to lump or cake, and are generally unsuitable for use in continuous, fluid bed reactors.

It is, accordingly, an object of this invention to provide a catalyst for the vinylation of alcohols which avoids the above-indicated drawbacks and disadvantages.

It is another object of the invention to provide a process for the vinylation of alcohols which is particularly adapted for economical fluid bed operation.

In acordance with this invention there is provided a catalyst which is the dried reaction product of calcium carbide and an alcohol and the process of this invention for preparing vinyl ethers comprises reacting an acetylene and an alcohol in the presence of a said catalyst, thereby forming the vinyl ether of said alcohol, and recovering the vinyl ether.

The process of this invention provides a convenient and satisfactory technique for preparing vinyl ethers from alcohols. Preferably, the alcohols employed will be monohydric alkyl, aryl or alkenyl alcohols. The alkyl, aryl and alkenyl groups present in the alcohols may be inertly substituted, i.e. may bear substituents which do not react with any of the reactants, reaction components or products under the conditions employed. Typical inert substituents include alkyl, aryl, alkenyl, and ether. Illustrative alkyl alcohols include methanol, ethanol, n-propanol, n-butanol, sec-butanol, hexanol, octanol, decanol, dodecanol, octadecanol, 2-ethoxyethanol, 2-ethylhexanol, benzyl alcohol, β-phenylethanol, cyclohexanol, 4-methylcyclohexanol, etc. Illustrative aryl alcohols include phenol, p-cresol, etc. Illustrative alkenyl alcohols include allyl alcohol. The preferred alcohols are the lower alkanols, i.e. alkyl alcohols containing less than about 8 carbon atoms, and most preferably methanol.

The acetylenes which may be employed in the process of this invention are those of the formula $RC \equiv CH$ group wherein R is H, an alkyl group, or an aryl group. Examples of acetylenes include acetylene, propyne, 1-butyne, 1-hexyne, phenylacetylene, etc. The preferred acetylene is acetylene itself.

As previously mentioned, the catalyst is the dried reaction product of calcium carbide and an alcohol and comprises principally a calcium alcoholate of a lower alkanol, i.e. a catalyst composition of which at least 50% by weight is said calcium alcoholate. The lower alkanol of the calcium alcoholate will contain less than about 8 carbon atoms, and preferably 1 to 4 carbon atoms. For example, the calcium alcoholate may be calcium methylate, calcium ethylate, calcium propylate, calcium butylate, etc. Calcium methylate and calcium ethylate are preferred.

Suitably the catalyst composition of this invention is prepared by reacting calcium carbide with an excess of a lower alkanol, preferably methanol or ethanol. The lower alkanol may be the same as or different from the alcohol to be vinylated. In preferred embodiments, the excess of lower alkanol will serve as the reaction medium or suspending liquid for the calcium carbide-alkanol reaction.

The reaction of the calcium carbide with the lower alkanol may be effected over a wide range of temperatures. At room temperature or lower, prolonged periods up to about 3 days may be required to complete the reaction. The reaction can be effected in a shorter time, say about 3 hours by heating the mixture to the reflux temperature of the lower alkanol. If desired, the reaction may be conducted at higher temperatures and pressures, e.g. up to about 250° C. and 1000 p.s.i.g. in an autoclave.

During the reaction of the calcium carbide with the lower alkanol, acetylene is produced, the calcium carbide is converted primarily to the calcium alcoholate, and minor quantities, less than 50% by weight of the total, of calcium oxide and some calcium hydroxide are formed. The reaction between calcium carbide and the alkanol also produces some vinyl ether of the alcohol. This is believed to take place because of the alkaline character of the calcium alcoholate and calcium oxide present in the reaction mixture. The catalyst composition is suitably filtered from the lower alkanol and dried. It is generally isolated as a fine, free-flowing powder which is suitable for direct use in a fluidized bed. It is substantially nonhygroscopic and is not deactivated by ambient moisture. It is also comparatively stable at temperatures up to about 400° C. or higher. If desired, it can be shaped to form aggregates such as pellets, tablets, cylinders, spheres and the like for use in fixed beds.

The catalyst can be used in the form of a fluidized bed, a fixed bed, a dispersion in an inert diluent, etc. Preferably, it is employed as a fluidized bed. In preferred embodiments, the acetylene and the alcohol to be vinylated are preblended, preferably in the vapor phase, prior to contacting them with the catalyst. Most conveniently the acetylene is used to carburet the alcohol, held at a desired temperature and vapor pressure to give the required proportion of acetylene and alcohol, to the reaction zone.

The acetylene-alcohol blend composition may be varied over a fairly wide range, depending upon the reactants and reaction conditions involved. Typically, the molar ratio of acetylene to alcohol will be between about 1.1:4 and 4:1. The composition of the blend can be conveniently regulated by regulating the temperature of the alcohol for carburetion by acetylene.

As a further variation, the reaction can be conducted in the liquid phase by running it at a temperature below the critical temperature of the alcohol and at a pressure which is sufficiently high to maintain the alcohol in the liquid state. The catalyst can be suspended in the liquid alcohol and acetylene added thereto.

The reaction temperature and pressure will vary depending upon a variety of factors, including the reactants chosen, the equipment used, and contact or residence time. Where it is desired to run the reaction in the vapor phase, the reaction temperature should be above the boiling points of the reactants and the resultant products at the pressure employed. Reaction temperatures between 150° and 350° C. are generally preferred. Above about 350° C., polymerization of acetylene may become appreciable and yields of product based on acetylene may decrease. Below about 150° C. the reaction proceeds too slowly and is generally disadvantageous. The reaction generally proceeds in a satisfactory manner at atmospheric pressure, but higher or lower pressures may also be employed, if desired.

Flow velocities and residence time of the reactants can be varied depending upon the system used, the volume and cross-section of the catalyst bed, etc. Flow velocities of the order of 0.5 to 1.5 feet per second and space velocities of about 1.0 to 1.5 vol. gas./vol. cat./min. are generally suitable.

The desired product is typically recovered by condensing the vapors obtained and fractionally distilling to free it from unreacted starting materials and by-products. In preferred embodiments of the invention, such as the preparation of vinyl methyl ether, little or no by-product is obtained. Any unreacted starting materials are readily recovered and may be recycled in the process.

Thus, it is one of the features of the process of this invention that it readily lends itself to the recycling and re-use of the by-products of the reaction, so that a particularly efficient, integrated process can be realized. Thus, in a typical system involving a reaction zone containing a fluidized bed composed of the catalyst into which the acetylene and the lower alkyl alcohol are introduced, the vapors issuing from the reaction zone and consisting of the alcohol, the acetylene and the product ether can be initially condensed and the liquid products (ether and alcohol) separated from the acetylene in a separating zone. From the separating zone the acetylene is recycled for admixture with the alcohol for introduction into the reaction zone. The vinyl ether and the alcohol are then separated in a second separating zone, with the vinyl ether being recovered as the product and the alcohol being recycled to the reaction zone. The catalyst, after reaction and when it is desired to use a fresh catalyst bed, can be treated with steam in a stripping zone to form $Ca(OH)_2$ and alcohol. The aqueous alcohol can then be dehydrated and either returned for use as feed or can be reacted with calcium carbide to form additional quantities of fresh catalyst. The hydrated lime can be calcined to calcium oxide and then reacted with coke to form calcium carbide in conventional manner for use in forming fresh catalyst. Since some of the catalyst may be decomposed in the reaction, the quantity of catalyst can be maintained by adding small amounts of calcium carbide to the reaction zone wherein new catalyst is formed in situ to compensate for the catalyst decomposed.

The following examples are provided to further illustrate the invention and to set forth the manner in which it is now preferred to practice this invention. It will be understood, however, that the invention is not limited to the specific embodiments described. Many variations will occur to those skilled in the art or will be obvious from the description given herein and variations can be made without departing from the scope of this invention. The invention is not to be limited except as defined in the appended claims.

EXAMPLE 1

200 grams of calcium carbide of 69.4% purity and having an average particle size of about ¼" mesh is dispersed in 500 cc. of anhydrous methanol and the dispersion formed is heated to 40° C. for 3 hours. It is then cooled to room temperature and the solid material present is filtered off and dried in vacuo to give 181.3 grams of finely-divided, free-flowing powder which analysis indicates to be 69.4% calcium methylate and 30.6% calcium oxide.

The so-prepared catalyst composition is placed in a reactor tube having a length of 38 inches and a cross-sectional area of 3.87 sq. cm. The tube is heated and maintained at a temperature of from 300–325° C. and a blend of acetylene and methanol wherein the molar ratio of acetylene to methanol is about 1.35:1, in the vapor state is passed through the bed at a rate of about 6.3 cm. per second, which is sufficient to maintain the bed in a fluidized state. The effluent is passed through a water-cooled condenser to remove unreacted methanol and then through a Dry Ice-acetone trap to condense and recover vinyl methyl ether. Unreacted acetylene is metered after the Dry Ice-acetone trap.

The reaction is run for about 2 hours, during which time 2.495 moles of acetylene and 1.855 moles of methanol are fed to the reactor. The yield of methyl vinyl ether based on methanol is 36% of theory. At the end of the reaction, the catalyst is again analyzed and shows no evidence of deactivation.

EXAMPLE 2

The catalyst and reactor of Example 1 are heated to 325° C. and acetylene and methanol in the vapor state are fed thereto at a velocity of about 0.254 feet per second. The reactant feed contains acetylene and methanol in the ratio of 0.54:1, respectively. The reaction is run for about 2 hours, during which time 1.676 moles of acetylene and 3.1 moles of methanol are fed to the reactor. The yield of methyl vinyl ether, based on methanol, is 25.6% of theory.

EXAMPLE 3

Calcium carbide in the amount of 1.08 moles is dispersed in 6.87 moles of ethanol in an autoclave. The autoclave is heated to 205° C. at a pressure of 450–660 p.s.i.g. and maintained at these conditions for 7.5 hours. It is then cooled and the reaction mixture is removed. The solid material present is filtered off and dried in vacuo to give approximately 90 grams of finely-divided, free-flowing powder suitable for use in a fluidized bed. Analysis indicates the composition to be 40% calcium ethylate and 60% calcium oxide.

It will be apparent to those skilled in the art that various changes and modifications may be made in the embodiments described above without departing from the invention, as defined in the appended claims. It is intended, therefore, that all matter contained in the foregoing description shall be interpreted as illustrative only and not as limitative of the invention.

We claim:

1. The process for preparing vinyl ethers which comprises reacting together an acetylene hydrocarbon having the formula $RC \equiv CH$ wherein R is H or an alkyl group and an alkanol containing up to 18 carbon atoms at a temperature between about 150° C. and 350° C. in the presence of a catalyst principally comprising a pre-formed calcium alcoholate of a lower alkanol thereby forming the vinyl ether of the first alkanol, and recovering said vinyl ether, the reaction being carried out in the vapor phase in a fluidized bed, and calcium carbide being added to the system in amounts to compensate for the catalyst decomposed during the course of the reaction.

2. The process of claim 1 wherein said alkanol reactant is a lower alkanol.

3. The process of claim 1, wherein said calcium alcoholate is calcium methylate.

References Cited

UNITED STATES PATENTS

| | | | |
|---|---|---|---|
| 1,959,927 | 5/1934 | Reppe. | |
| 2,066,076 | 12/1936 | Reppe et al. | 260—611 X |
| 3,009,964 | 11/1961 | Russell | 260—632 |
| 3,094,546 | 6/1963 | Towers | 260—448 |

FOREIGN PATENTS

| | | |
|---|---|---|
| 932,670 | 7/1963 | Great Britain. |
| 163,608 | 8/1964 | U.S.S.R. |

LEON ZITVER, *Primary Examiner.*

H. MARS, *Assistant Examiner.*